US009798010B2

(12) United States Patent
Fischer et al.

(10) Patent No.: US 9,798,010 B2
(45) Date of Patent: Oct. 24, 2017

(54) DEVICES, METHODS, AND APPARATUSES FOR MOBILE DEVICE ACQUISITION ASSISTANCE

(71) Applicant: QUALCOMM Incorporated, San Diego, CA (US)

(72) Inventors: Sven Fischer, Nuremberg (DE); Stephen William Edge, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1149 days.

(21) Appl. No.: 13/732,071

(22) Filed: Dec. 31, 2012

(65) Prior Publication Data
US 2014/0035782 A1 Feb. 6, 2014

Related U.S. Application Data

(60) Provisional application No. 61/678,021, filed on Jul. 31, 2012.

(51) Int. Cl.
*G01S 19/06* (2010.01)
*G01S 19/25* (2010.01)

(52) U.S. Cl.
CPC ............ *G01S 19/06* (2013.01); *G01S 19/252* (2013.01); *G01S 19/254* (2013.01)

(58) Field of Classification Search
CPC .......... G01S 19/06; G01S 19/05; G01S 19/03; G01S 19/252
See application file for complete search history.

(56) References Cited

U.S. PATENT DOCUMENTS

2004/0078140 A1 4/2004 Rowitch et al.
2005/0285783 A1* 12/2005 Harper .................... G01S 19/30
342/357.69

(Continued)

FOREIGN PATENT DOCUMENTS

| CN | 1484038 A | 3/2004 |
|----|-----------|--------|
| CN | 102037378 A | 4/2011 |
| EP | 2177927 A1 | 4/2010 |

OTHER PUBLICATIONS

Harper et al. "Process for Improving GPS Acquisition Assistance Data and Server-Side Location Determination for Cellular Networks." Journal of Global Positioning Systems, vol. 3, No. 1-2: 132-142. 2004.*

(Continued)

*Primary Examiner* — Gregory C Issing
(74) *Attorney, Agent, or Firm* — Berkeley Law & Technology Group, LLP

(57) ABSTRACT

Methods, apparatuses and/or articles of manufacture, which may be employed in a mobile device and/or in a location server, enable acquisition assistance at the mobile device. In at least one implementation, which is not intended to limit claimed subject matter, acquisition assistance may include expected Doppler frequency shift and expected code phase in the case of a particular Global Navigation Satellite System (GNSS) satellite vehicle, as well as a search window for each of these, and a confidence value. The confidence value may indicate the likelihood of detecting signals from the satellite vehicle at the current expected location of the mobile device and within the given search windows and may enable one or more of faster location estimation, reduced battery consumption, and detection of weaker satellite signals.

29 Claims, 9 Drawing Sheets

(56) References Cited

U.S. PATENT DOCUMENTS

2006/0103575 A1* 5/2006 Moeglein ............... G01S 19/05
                                                      342/357.45
2009/0312034 A1  12/2009 Burroughs et al.
2011/0159886 A1* 6/2011 Kangas ................ H04W 4/02
                                                      455/456.1

OTHER PUBLICATIONS

3GPP TS 36.355 V9.5.0 (Mar. 2011), 3rd Generation Partnership Project; Technical Specification Group Radio Access Network; Evolved Universal Terrestrial Radio Access (E-UTRA); LTE Positioning Protocol (LPP) (Release 9), 114 pp.
International Search Report and Written Opinion—PCT/US2013/052427—ISAEPO—Dec. 4, 2013.

* cited by examiner

DEVICES, METHODS, AND APPARATUSES FOR MOBILE DEVICE ACQUISITION ASSISTANCE

CROSS-REFERENCE TO RELATED APPLICATION

This application claims priority under 35 U.S.C. §119(e) from U.S. provisional patent application No. 61/678,021, filed Jul. 31, 2012, the entire contents of which are incorporated herein by reference.

BACKGROUND

1. Field

The subject matter disclosed herein relates to electronic devices, and more particularly to methods, apparatuses, and articles of manufacture which may be used in association with providing acquisition assistance to a mobile electronic device.

2. Information

Many mobile electronic devices, such as cellular telephones, portable satellite navigation devices, mobile computers, and the like, may include an ability to estimate location and/or position of the mobile device with a high degree of accuracy. An ability to estimate a mobile device's location may be made possible by any one of several signals-based position estimation technologies such as, for example, satellite positioning systems (e.g., the Global Positioning System [GPS] and the like), advanced forward-link trilateration (AFLT), observed time difference of arrival (OTDOA), enhanced cellular identification (ECID), just to name a few examples. As a result, mobile device users may be provided with many different services such as, for example, emergency location services, vehicle or pedestrian navigation, location-based searching, and so forth.

In many instances, a mobile device that estimates a position as a result of receiving signals from space vehicles of a satellite positioning system (SPS), for example, may be assisted by signals carrying information from a terrestrial wireless or wireline voice or data communications system. Such assistance data signals may reduce a time required by the mobile device to acquire signals from a SPS, for example, and to determine location measurements, such as pseudoranges, for example, or to estimate location of the mobile device based, at least in part, on measured and/or decoded characteristics of acquired signals. Under some circumstances, assistance may reduce the time spent by a mobile device in performing location measurements, and/or computing an estimate of its location, from several minutes to several seconds. Such assistance may also enable weaker (e.g. signals attenuated or reflected by surrounding buildings and walls in an urban or indoor environment), SPS signals to be acquired and measured, thereby enabling location of a mobile device in a greater number of environments.

SUMMARY

In an example implementation, a method may be performed at a location server for providing acquisition assistance parameters for use in acquisition of one or more positioning system signals. The method may comprise determining an initial estimated location of a mobile device and an uncertainty area of the initial estimated location and/or uncertainty area, determining a confidence value for the initial estimated location for use in computing the acquisition assistance parameters, determining the acquisition assistance parameters including one or more search windows, and transmitting the acquisition assistance parameters and the confidence value to the mobile device.

In another example implementation, an apparatus comprises a transmitter; and one or more processors to: determine an initial estimated location of a mobile device and/or an uncertainty area of the initial estimated location, determine a confidence value for the initial estimated location estimate for use in computing acquisition assistance parameters for use in acquisition of one or more positioning signals from the transmitter, determine the acquisition assistance parameters including one or more search windows, and initiate transmission of the acquisition assistance parameters and the confidence value through the transmitter to the mobile device.

In another example implementation, an article comprises a storage medium comprising machine-readable instructions stored thereon which are executable by a special purpose computing apparatus to: determine an initial estimated location of a mobile device and an uncertainty area of the initial estimated location, determine at least one confidence value for the initial estimated location and/or uncertainty area for use in computing acquisition assistance parameters for use in acquisition of one or more positioning system signals, determine the acquisition assistance parameters including one or more search windows; and initiate transmission of the acquisition assistance parameters and the at least one confidence value to the mobile device.

In another example implementation, and apparatus comprises means for determining an initial estimated location of a mobile device and an uncertainty area of the initial estimated location, means for determining at least one confidence value for the initial estimated location and/or uncertainty area for use in computing acquisition assistance parameters for use in acquisition of one or more positioning system signals, means for determining the acquisition assistance parameters including one or more search windows, and means for transmitting the acquisition assistance parameters and the at least one confidence value to the mobile device.

In another example implementation, a method performed by a mobile device comprises receiving one or more acquisition assistance parameters for use in acquisition of one or more positioning system signals defining at least one search window and/or a confidence value, attempting acquisition of the one or more of the positioning system signal by searching in a range defined by the at least one search window, and extending the at least one search window in response to an absence of detection at least one characteristic of the one or more positioning system signals in the range based, at least in part, on the confidence value.

In another example implementation, an apparatus comprises a first receiver to receive satellite positioning system (SPS) signals, a second receiver to receive messages transmitted in a wireless communication network; and one or more processors to: obtain one or more acquisition assistance parameters defining at least one search window and/or a confidence value from one or more messages received from the second receiver. The one or more processors additionally extending the at least one search window in response to an absence of detection at least one characteristic of the SPS signal received from in a range based, at least in part, on the confidence value.

In another example implementation, an article comprises a storage medium comprising machine-readable instructions stored thereon which are executable by a special purpose computing apparatus to: obtain one or more acquisition assistance parameters for use in acquisition of one or more positioning system signals and a confidence value, the acquisition assistance parameters defining a range within at least one search window; and extend the at least one search window in response to an absence of detection at least one characteristic of a received positioning system signals in the range based, at least in part, on the confidence value.

In another example implementation, an apparatus comprises means for receiving one or more acquisition assistance parameters for use in acquisition of one or more positioning system signals defining at least one search window and a confidence value, means for attempting acquisition of at least one positioning system signals by searching in a range defined by the at least one search window, and means for extending the search window in response to an absence of detection at least one characteristic of one or more positioning system signals in the range based, at least in part, on the confidence value.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
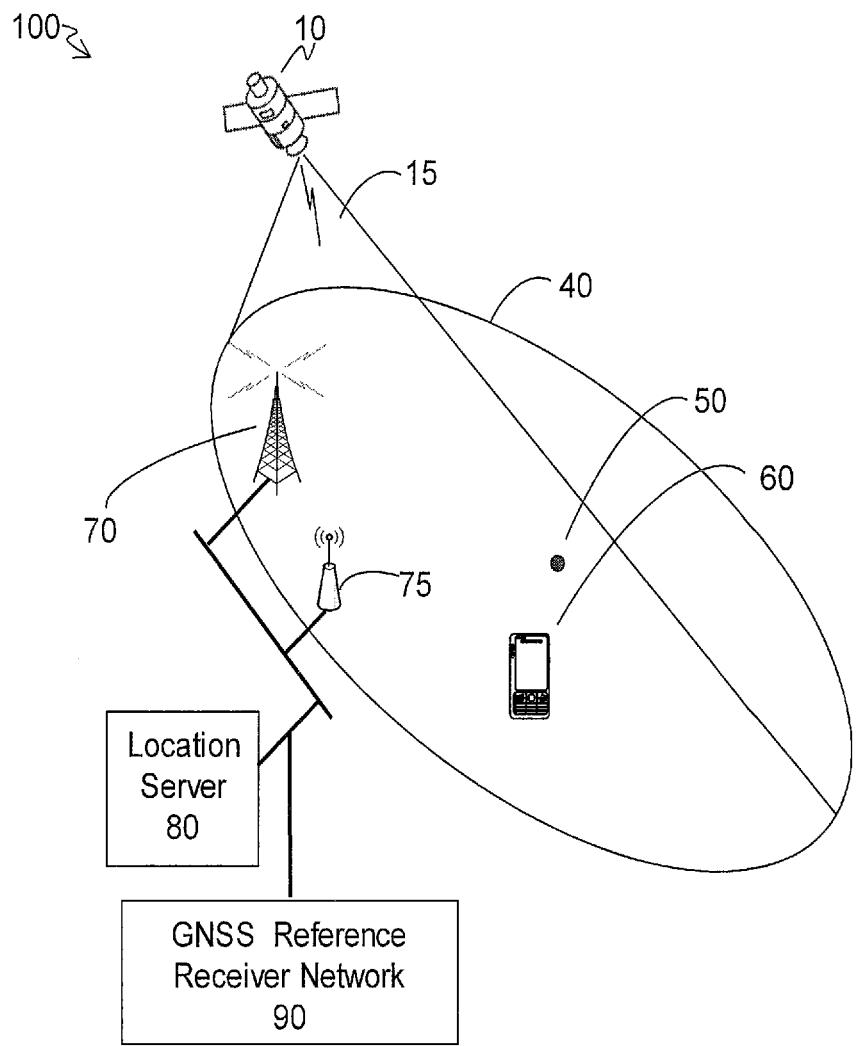
FIG. 1 is a schematic diagram showing an implementation of a method for providing mobile device acquisition assistance parameters according to an example implementation.

As illustrated by the examples herein, various methods, apparatuses and articles of manufacture may be implemented in mobile devices and special purpose computing platforms for providing acquisition assistance to one or more mobile devices.

According to an embodiment, a mobile device 60 may comprise a receiver to acquire an SPS signal transmitted from a space vehicle in a Global Navigation Satellite System (GNSS), such as GPS, Galileo, or GLONASS, by correlating a received signal with a waveform modulated by a locally generated pseudonoise sequence. The terms GNSS and SPS are synonymous and are used interchangeably herein. Using well-known techniques, the receiver may perform a two-dimensional search (Doppler and code phase dimensions) to detect correlation peaks within the correlated signal to derive pseudorange measurements to the space vehicle. To the extent possible, limiting a range for the two-dimensional search may enable one or more of a faster time to fix, a greater time for signal measurement to detect a correlation peak, and a reduction in use of battery resources to perform the position fix.

While acquisition assistance parameters may reduce the time and/or increase the reliability and accuracy for determining location measurements and computing an estimated location of a mobile device, assistance provided by terrestrial voice and/or data communications systems may be of little value if an approximate location area or region of the expected mobile device location is not known initially. For example, an approximate expected mobile device location area may be determined by the location of the mobile device's serving base station or access point together with its service or coverage area. However, location of the serving base station and/or its service area may not always be precisely or reliably known if the serving base station is a "small cell" base station or a WiFi access point, for example.

In the context used herein, "small cells" is an umbrella term for low-powered radio access nodes with limited coverage area (e.g., of up to a hundred or a few hundred meters), and may encompass femtocells, picocells, and microcells, or the like. Femtocells, which may include home base stations, may be purchased by an end-user and connected to a home or office broadband interface (e.g., fiber, cable, DSL, or the like) to boost network signals inside buildings. Accordingly, location of such small cell base stations may not always be precisely or reliably known (e.g., because the small cell may have been moved from an initial to a new location or because the initial location may have been reported or recorded incorrectly). Thus, in some instances, it may be advantageous to refrain from providing assistance data signals to mobile devices unless locations of signal transmitting/receiving components (e.g. base stations, access points, and so forth) involved in assisting the mobile device are known with a high degree of reliability. In such instances, without acquisition assistance, a mobile device may consume an increased amount of time to acquire signals from an SPS, for example, and in some cases may fail to acquire a sufficient number of signals to enable location determination.

In implementations, a reduction in the time to determine location measurements and/or compute an estimated location of the mobile device, as well as increased measurement accuracy and increased sensitivity, may be achieved by receiving and employing acquisition assistance parameters. Received acquisition assistance parameters may assist the mobile device in acquiring signals from a satellite positioning system, for example, by narrowing a search window of parameters, such as Doppler frequency shift and/or pseudorandom code phase, which may be used by the mobile device to estimate position. By reducing the size of the search window of Doppler frequency and/or pseudorandom code phase, a mobile device may acquire SPS signals, for example, in reduced time and/or with greater accuracy and success.

Although implementations described herein may refer to acquisition assistance using signals from an SPS, acquisition assistance parameters may also be employed in assisting other positioning methods such as AFLT and/or OTDOA to reduce the time to acquire and determine, and/or increase the accuracy and sensitivity of, location measurements from terrestrial cellular base station signals. Analogous to SPS signals, acquisition assistance parameters may reduce the size of the search window of, for example, time-of-arrival measurements of base station signals from serving and/or neighboring base stations or access points.

In an example in which a mobile device may use AFLT to compute an estimated location, a mobile device may measure a pilot phase of a one or more received code division multiple access (CDMA) signals from terrestrial cellular base stations. A terrestrial cellular base station may provide acquisition assistance parameters in the form of expected values for CDMA pilot phase and a search window comprising one or more ranges of pilot phases. A mobile device may employ such acquisition assistance parameters to (i) reduce time spent by the mobile device in estimating its location and/or (ii) increase signal integration time to improve accuracy and sensitivity.

In an example in which mobile device may use an OTDOA technique, a mobile device may measure time difference of arrival of signals from two or more terrestrial cellular base stations. A terrestrial cellular base station or a network location server may provide acquisition assistance parameters in the form of one or more windows of expected differences in time of arrival of signals transmitted from base stations and received by a mobile device. Time difference of arrival windows may reduce time spent by the mobile device in estimating its location and/or may increase the accuracy and reliability of the estimated location.

A time to determine location measurements and compute an estimated location of a mobile device may be further reduced, and/or the accuracy and reliability of the estimated location may be further increased, by informing the mobile device of the confidence in the search window parameters. Thus, a "confidence value" may indicate the probability that a mobile device is capable of obtaining measurements of one or more characteristics of SPS signals, for example, within a given search window. If search window parameters are provided (e.g. by a network location server) with relatively low confidence, the mobile device may schedule processing resources to search both inside as well as outside of the boundaries of the search window. On the other hand, if search window parameters are known with relatively high confidence (e.g. less than 70%), the mobile device may schedule internal processing resources so as to place a premium on searching only within the boundaries of the search window. In many instances, this may enable the mobile device to consume only a small amount of time in acquiring SPS signals (e.g. a few seconds or less) or may enable the mobile device to acquire weaker signals and/or measure the signals with higher accuracy.

In the context used herein, the term "search window" defines at least one subset of a larger search parameter space. If the search window is provided, a mobile device typically only needs to look for, acquire and then measure signals conforming to the search window, whereas if a search window is not provided, a mobile device typically needs to look for, acquire and then measure signals that may be anywhere in the larger search parameter space. Thus, in one possible example, a Doppler frequency search window of ±1.0 kHz may be formed from a Doppler frequency search space of, for example, ±5.0 kHz. In another possible example, which pertains to a code phase search window, a window of between 0.0 and 31.0 "chips" may be formed from a larger parameter search space of between 0.0 and 1023.0 chips. A "chip" may be defined herein as a rate at which a pseudonoise code may modulate binary digits representing information states conveyed by way of a GPS signal. Additionally, as will be discussed further herein, the term "reliability indicator" may be utilized to indicate reliability of a search window and/or a confidence value. A mobile device may, in some implementations, utilize a reliability indicator and/or a confidence value to schedule internal processing resources so as to reduce an amount of time to acquire SPS signals.

In some implementations, if SPS signals can be acquired, a mobile device may transmit its location measurements to a location server which uses the location measurements to determine an estimate of the location of the mobile device. The location server may compare the resulting estimated location of the mobile device with the initial approximate estimated location and uncertainty area the mobile device used previously to determine the acquisition assistance parameters. If the estimated location of the mobile device is within an initial uncertainty area, the location server may increase a confidence value provided with search window parameters to similarly-located mobile devices at future times. For example, if the initial approximate estimated location and uncertainty area for the mobile device are associated (e.g. in a database) with the identity of the serving cell, serving base station, or serving access point for the mobile device, the location server may (i) increase the confidence value for the initial approximate estimated location and uncertainty area and/or (ii) may reduce the size of the uncertainty area. Alternatively or in addition, the location server may record statistics for the resulting estimated locations for many mobile devices located in association with the same serving cell, base station or access point. For example, the location server may record how often the location is within the uncertainty area and/or may record the mean and variance of the difference between the estimated location and the initial approximate location and use these statistics to periodically adjust and improve the initial approximate location and/or the uncertainty area and confidence that are associated with the particular serving cell, base station, or access point.

In certain implementations, if a resulting estimated position of a mobile device using acquired SPS signals lies outside of an uncertainty area previously estimated by a location server, the location server may reduce a confidence value provided to similarly-located mobile devices (e.g. mobile devices located in association with the same serving cell, serving base station, or serving access point). In addition to or in place of providing a reduced confidence value, the location server may increase an uncertainty area provided to similarly-located mobile devices or may change the initial approximate expected location. For example, if the resulting estimated position of a mobile device is remote from the initial approximate estimated location (e.g. more than 1 kilometer distant in the case of a serving WiFi access point or Femtocell, or more than 10 kilometers distant in the case a serving cell or base station in an urban environment) and the same result occurs for other mobile devices located in association with the same serving cell, base station or access point, the location server may combine the resulting estimated positions for the mobile devices (e.g. by averaging) and substitute this for the previous approximate expected location associated with the particular cell, base station, or access point. In this example, the location server could also determine the smallest elliptical or circular area containing the resulting estimated positions and use this as a new uncertainty area with an initial high confidence value.

FIG. 1 is a schematic diagram showing an implementation of a method for providing mobile device acquisition assistance parameters for GNSS signals according to an example implementation. In FIG. 1, space vehicle 10 transmits one or more SPS signals 15 in the direction of mobile device 60. Space vehicle 10 may, for example, represent one or more orbiting space vehicles of an SPS, which may comprise a part of a GNSS such as Global Positioning System (GPS), Galileo, GLONASS, or the like. Space vehicle 10 may also represent one or more orbiting space vehicles of a regional satellite navigation system such as, for example, Quasi-Zenith Satellite System (QZSS) over Japan, Indian Regional Navigational Satellite System (IRNSS) over India, Beidou/Compass over China, etc., and/or various augmentation systems (e.g., an Satellite Based Augmentation System (SBAS)) that may be associated with or otherwise enabled for use with one or more global and/or regional navigation satellite systems. It should be noted that claimed subject matter is not limited to the use of space vehicles such as those space vehicles of the aforementioned global or regional satellite navigation systems.

Additionally represented in FIG. 1 is terrestrial cellular base station 70, which may represent, for example, a 3G- or 4G-compatible base station capable of transmitting to and receiving signals from mobile device 60 and may be the serving base station for mobile device 60. Thus, terrestrial cellular base station 70 may comprise a base station for receiving and transmitting signals compatible with CDMA, Long Term Evolution (LTE), High Rate Packet Data (HRPD), Global System for Mobile Communications (GSM), and Wideband CDMA (WCDMA), personal area and medium range network signals such as Bluetooth, WiFi networks, wireless local area network (WLAN), a wireless personal area network (WPAN), worldwide interoperability for microwave access (WiMAX) system. In the implementation of FIG. 1, at least a portion of signals communicated between mobile device 60 and terrestrial cellular base station 70 may be utilized by location server 80 to compute an initial approximate estimated location of mobile device 60. Cellular base station 70 and location server 80 may cooperate with or enable mobile device 60 to employ, for example, advanced forward-link trilateration (AFLT), observed time difference of arrival (OTDOA), cellular identification (CID) and enhanced cellular identification (ECID), just to name a few examples, to compute an initial approximate estimated location. In addition to computing an initial approximated estimated location, location server 80 may also compute an uncertainty area (or areas) 40. In implementations, the size of the uncertainty area 40 may be influenced by the method used for determining the initial approximate estimated location. For example, CID, ECID, OTDOA, and/or AFLT may provide different accuracies of the initial approximate location estimate, and therefore, different sizes of uncertainty areas.

In an implementation, terrestrial cellular base station 70 may represent a fixed cellular base station having a well-defined location and coverage area. Thus, for example, terrestrial cellular base station 70 may receive a signal from mobile device 60 located at any location within a coverage area. Reception of a signal from mobile device 60 may be utilized by location server 80 to determine that mobile device 60 is located within a coverage area. In particular implementations, location server 80 may communicate with GNSS reference receiver network 90 to determine one or more acquisition assistance parameters that may be utilized by mobile device 60 in determining location measurements and/or computing a position estimate. Acquisition assistance parameters may include Doppler frequency shifts, information states related to pseudorandom code phase timing, satellite ID numbers, and so forth.

In particular implementations, various acquisition assistance parameters may be provided to a mobile device by location server 80 with information states received from GNSS reference receiver network 90. For example, in accordance with the Third Generation Partnership Project (3GPP) Technical Specification (TS) 36.355 titled "Evolved Universal Terrestrial Radio (E-UTRA); LTE Positioning Protocol (LPP)," location server 80 may provide acquisition assistance parameters shown in Table 1 below to support location using GNSS. Acquisition assistance parameters provided to mobile device 60 may include, but are not limited to, Satellite ID, Doppler first order, Doppler second order, Doppler uncertainty, code phase, integer code phase, code phase search window, azimuth, and elevation parameters for any particular satellite used by mobile device 60 to obtain location measurements. In implementations, additional acquisition parameters, such as confidence and reliability, may be provided to the mobile device as will be described further herein.

TABLE 1

GNSS Acquisition Assistance Parameters (per-satellite)

| Field | Description |
| --- | --- |
| Satellite ID | Satellite ID for which the acquisition assistance data are given. |
| Doppler ($^{th}$ order term) | Expected value of Doppler frequency shift at center point of search window |
| Doppler ($1^{st}$ order term) | Expected value of Doppler frequency shift $1^{st}$ order term |
| Doppler Uncertainty | Doppler frequency shift uncertainty value experienced by the target device |
| Code Phase | Expected code phase, modulo 1 ms |
| Integer Code Phase | Integer number of 1-ms code phase period |
| Code Phase Search Window | Code phase search window |
| Azimuth | Azimuth of the satellite |
| Elevation | Elevation of the satellite |
| Confidence | Level of confidence in one or more of Doppler Uncertainty, Code Phase Search Window |
| Reliability | Measure of reliability in confidence value |

In implementations in which, for example, three terrestrial cellular base stations 70 transmit signals to mobile device 60, location server 80 may utilize a positioning technology such as AFLT, OTDOA, ECID, or the like, to compute, via trilateration, for example, an initial approximate estimate of the location of mobile device 60. Such an initial approximate estimate of the location of mobile device 60 may be represented in FIG. 1 by initial estimated location 50. Location server 80 may also associate initial estimated location 50 with uncertainty area 40 (e.g., a circular or elliptical uncertainty area whose center is the location 50).

In certain implementations, mobile device 60 may communicate with or receive signals from access point 75, which may represent a Wi-Fi access point, a Piconet access point, a femtocell cellular base station, or other component. In some instances, access point 75 may be positioned at a semi-fixed location such as a Wi-Fi access point that may be positioned at different locations from time to time. Thus, in implementations, if location server 80 is unaware of any repositioning of access point 75 or terrestrial cellular base station 70 (or any error in the location recorded for these), an attempt to compute an initial approximate estimated location of mobile device 60 relative to access point 75 or base station 70, using, for example, basic CID, OTDOA, AFLT, or ECID technique, may bring about an error in locating the mobile device. Thus, location server 80 may, for example, compute an initial approximate estimated location of mobile device 60 based, at least in part, on a last known location or an erroneous location of access point 75, or base station 70 which may be several kilometers or more, for example, from the access point or base station's current location. In a particular implementation, location server 80 may provide acquisition assistance parameters that may direct mobile device 60 to search within a Doppler frequency shift/code phase window in which signals from one or more of space vehicles 10 of an SPS may not be present. Accordingly, mobile device 60 may be unable to acquire a signal from space vehicle 10, for example. In some instances, if a signal within the Doppler frequency shift/code phase window cannot be acquired, mobile device 60 may transmit an error message to location server 80.

Figure 2:
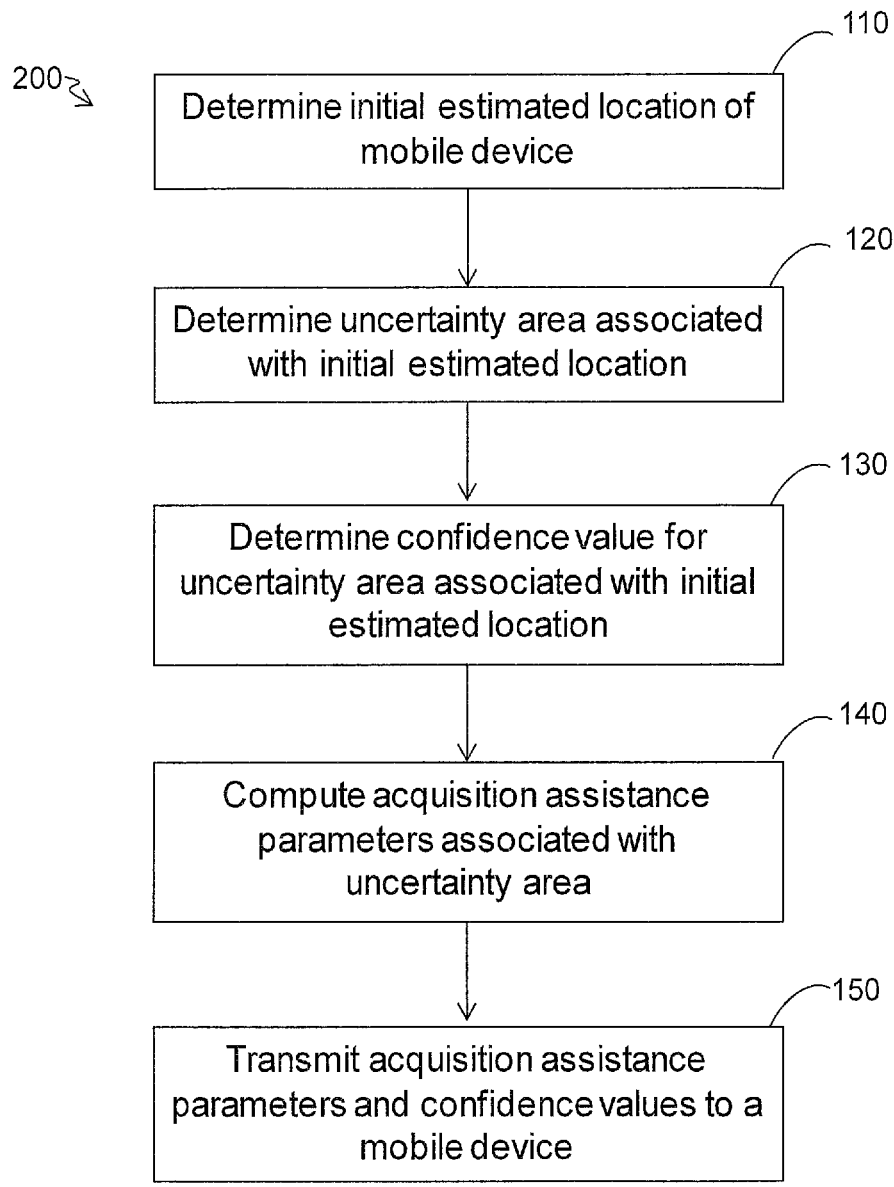
FIG. 2 is a flow diagram of a method used in a communication system for providing mobile device acquisition assistance according to an example implementation.

FIG. 2 is a flow diagram 200 of a method used in a communication system for providing mobile device acquisition assistance parameters according to an example implementation. The system of FIG. 1 may be suitable for performing the method of FIG. 2. However, claimed subject matter is not limited to the particular implementation of FIG. 1 and alternate arrangements of components in other implementations may be used. Example implementations, such as those described in FIG. 2 and others herein, may include blocks in addition to those shown and described, fewer blocks, blocks occurring in an order different than may be identified, or any combination thereof.

At block 110, the method of FIG. 2 begins with determining an initial approximate estimated location of a mobile device, such as mobile device 60 in FIG. 1. In implementations, an initial estimated location may be computed by a location server, such as location server 80 in FIG. 1, coupled to one or more terrestrial cellular base stations, such as base station 70 in FIG. 1, or one or more wireless access points, such as access point 75 in FIG. 1. An initial estimated location may be computed by a location server cooperating with terrestrial cellular base stations and mobile device to apply a location technique such as AFLT, OTDOA, CID, ECID, or other technique which may indicate a location of a mobile device relative to one or more currently serving or non-serving base stations.

In an implementation in which AFLT is employed, block 110 may involve a mobile device measuring a phase of a CDMA pilot signal and transmitting information states representing these measurements to a currently serving base station. A location server coupled to a currently serving base station may associate pilot phase characteristics measured at a mobile device with locations of cellular base stations generating the pilot signal. Trilateration may be used by location server to estimate an initial approximate position of a mobile device using transmitter positions and pilot phase measurements.

In other implementations, block 110 may involve a mobile device measuring signal strength of signals received from a Wi-Fi access point, a piconet access point, femtocell base station, or other smaller scale component of a wireless network. Indicators of received signal strength along with identifying information of an originating access point, femtocell base station, etc., may be transmitted from a mobile device to a serving wireless access point, for example, and routed to a location server. A location server may determine an initial approximate estimated location of the mobile device by comparing, for example, received signal strengths with coverage maps associating signal strengths with media access control (MAC) addresses or other identifiers. It should be noted that claimed subject matter is not limited to the above-identified techniques as other techniques may be used to determine an initial estimated location of a mobile device.

At block 120, an uncertainty area associated with an initial estimated location may be determined. In certain implementations, and uncertainty area may comprise a circle, a polygon or an ellipse projected onto an area of the Earth's surface. A location server may estimate the boundaries of an uncertainty area utilizing, for example, estimated amplitude and/or phase noise of one or more CDMA pilot signals transmitted from a currently serving base station to a mobile device, estimated distortion of the CDMA pilot from multipath interference between the transmitter and the mobile device, quantization errors in converting received signal measurements to representative digital electronic signals at the mobile device, effects of atmospheric conditions (e.g. weather) on signal propagation between the transmitter and the mobile device, locations of transmitting antennas, internal timing inaccuracy and errors in the mobile device, as well as a variety of other possible contributions. In implementations, an algorithm may be executed by a location server to generate an uncertainty area based, at least in part, on estimates of the above-identified error sources. In implementations, an uncertainty area based on the cell radius or cell-sector propagation distance of a serving base station may be computed. It should be noted that claimed subject matter is not limited to the above-identified methods to determine an uncertainty area.

At block 130, a confidence value for an uncertainty area may be determined, for example, by a location server. As mentioned previously herein, a location server may assign a relatively high level of confidence to initial estimated locations of a mobile device if the mobile device is located within an area served by one or more fixed cellular base stations having well established coverage areas. In one possible example among many, an uncertainty area of an initial estimated location of a mobile device located between three closely spaced serving base stations covering an area comprising relatively flat terrain may be assigned a relatively high level of confidence by a location server. In another possible example, an uncertainty area of an initial estimated location of a mobile device located between three widely separated serving base stations in a mountainous region may be assigned a lower level of confidence by a location server. In another possible example, an uncertainty area associated with an initial estimated location of a mobile device served by newly sited or recently repositioned Wi-Fi access points may be assigned a relatively low level of confidence by a location server. In some implementations, a location server may increase or reduce the uncertainty area and correspondingly increase or reduce the confidence value. This may be valid when the uncertainty area represents a coverage area of a serving base station or access point, for example, where there is a known or predictable relationship between distance from the base station or access point and the probability of receiving wireless coverage at that distance. Such adjustment as just described may be employed to attain a high confidence value (e.g. 95% or more).

At block 140, a location server may compute acquisition assistance parameters based, at least in part, on an uncertainty area of an initial approximate estimated location of a mobile device. In some implementations, the location server may compute acquisition assistance parameters comprising a code phase value, V1 for example, for a particular satellite of a particular GNSS system that the mobile device may be expected to observe if the mobile device were located at the initial approximate estimated location. In addition, the location server may compute a GNSS code phase value, V2 for example, that the mobile device may be expected to observe for the particular satellite if the device were located at a point on the uncertainty area nearest to the satellite. Further, the location server may compute a code phase value, V3 for example, that the mobile device may be expected observe if the device were located at a location within the uncertainty area farthest from the satellite. The computed code phase values may be used to define an expected code phase value which may be the value V1 and a code phase search window which may be defined by the values V2 and V3. Furthermore, a confidence value for the code phase search window may be obtained by the server from the confidence value for the uncertainty area. In one possible example, the confidence values may be assumed to be equal. A reliability for the code phase value and code phase search window may also or instead be obtained, for example, based on the location of the serving base station or access point for the mobile device being known to be correct and constant or being known to have changed one or more times in the past. In some implementations, acquisition assistance parameters may further comprise satellite identification numbers, Doppler shift frequencies, pseudorandom code phase timing shifts, and other parameters as discussed above, and claimed subject matter is not limited in this respect. At block 150, acquisition assistance parameters may be provided by the server to the mobile device.

Figure 3:
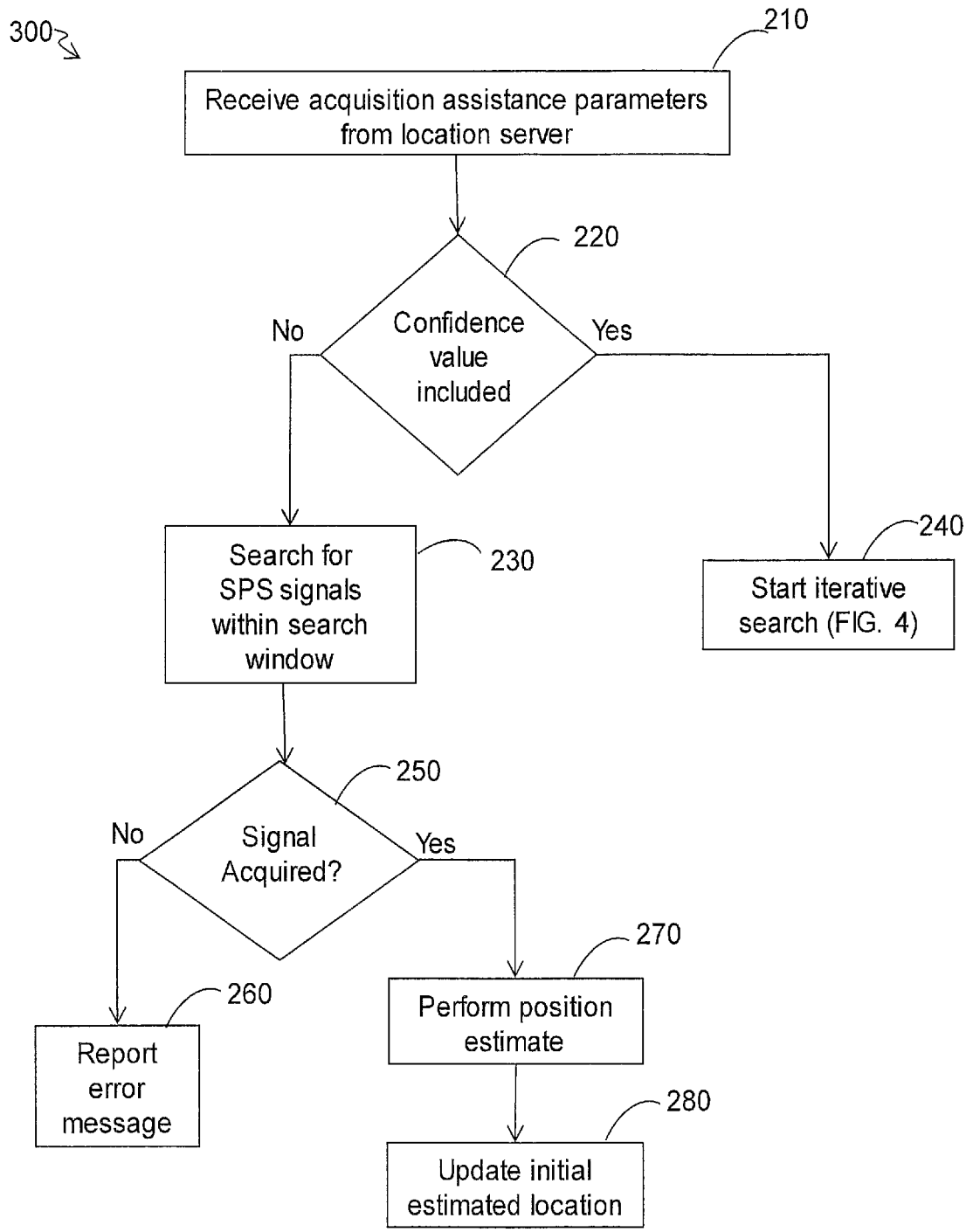
FIG. 3 is a flow diagram of a method used in a mobile device for receiving acquisition assistance according to an example implementation.

FIG. 3 is a flow diagram 300 of a method used in a mobile device for receiving GNSS acquisition assistance according to an example implementation. At block 210, a mobile device may receive acquisition assistance parameters from a location server. At block 220, a determination may be made as to whether a confidence value is included in the received acquisition assistance parameters. If a confidence value is not included in acquisition assistance parameters received from a location server, block 230 may be performed in which SPS signals may be searched within a search window.

In certain implementations, a reliability indicator may be used in place of a confidence value. A reliability indicator may indicate whether a search window, for example, is reliable or unreliable. In this manner, an information state comprising a single binary digit may be employed to express to a mobile device the location server's confidence in acquisition assistance parameters, such as Doppler shift and/or code phase window.

If a signal is detected, such as at block 250, a mobile device may report location measurements to the location server, which may then compute a position estimate based on one or more signals acquired from an SPS at block 270. At block 280, a computed position estimate may be used to update a location server. Updating, for example, may be utilized by location server to update future estimate of another mobile device's location and uncertainty area based on characteristics of received signals from the same base station(s) and/or access point(s).

If a signal has not been acquired, such as at block 250, a mobile device may report an error to a location server in block 260. An error may be utilized by a location server to, for example, provide acquisition assistance parameters to other mobile devices corresponding to a larger area of uncertainty and/or a lower level of confidence associated with the same base station(s) and/or access point(s). In particular implementations, acquisition assistance parameters corresponding to a larger area of uncertainty and/or a lower level of confidence may be utilized by a mobile device to expand search windows and/or to search in differently-sized windows, or a combination thereof. However, claimed subject matter is not limited in this respect.

Returning to block 220 of FIG. 3, if an outcome of block 220 indicates that a confidence value has been included in acquisition assistance parameters received from a location server, an iterative search, as identified at block 240, may be performed. Block 240 initiates FIG. 4, which is a flow diagram 400 of a search method used in a mobile device for receiving acquisition assistance according to an example implementation. The method of FIG. 4 begins at block 310 in which a mobile device may set an initial search counter to an integer value of one. At block 315, for an initial iteration, the variable "Δ" may be set equal to 0.0, which may represent part of a two-dimensional search window comprising GNSS code phase and Doppler frequency shift provided to a mobile device by a location server. At block 320, a mobile device may set an initial GNSS code phase search window for a particular satellite of interest equal to the code phase search window for this satellite received from the server in block 210 of FIG. 3 and may set a similar search window for GNSS Doppler frequency shift for this satellite based on other information received from the server in block 210 of FIG. 3.

At block 325, a mobile device may perform a search within the search windows provided by the location server. In implementations, a mobile device may perform search algorithm within a two-dimensional window in which, for example, for a first pseudorandom code phase timing parameter, a range of Doppler shift frequencies is searched. If the mobile device has not acquired an SPS signal, a pseudorandom code phase timing parameter may be set to a second value, and the mobile device may search the range of Doppler shift frequencies a second time. This process of incrementing a pseudorandom code phase parameter and searching among a range of Doppler shift frequencies may continue until a signal from an SPS is acquired or until the entire range of code phase values and Doppler shift frequencies defined by the two dimensional search window have been unsuccessfully searched. However, claimed subject matter is not limited to any particular searching technique performed at block 325.

At block 330, a mobile device may determine whether a signal has been acquired. If a signal has not been acquired, block 345 may be performed in which a mobile device may prepare for further searching by incrementing a search counter. At block 350, if a maximum search counter value has been exceeded, a mobile device may transmit an error message to a location server indicating an unsuccessful acquisition of a signal from one or more satellites of an SPS, such as at block 360. If a maximum counter value determined at block 350 has not been exceeded, block 355 may be performed in which the value of the variable "Δ" is expanded by an amount "x." At block 320, the initially provided GNSS code phase search window is expanded on either side by the current value of the variable "Δ". The search window for GNSS Doppler frequency shift may also be expanded. Block 325 may then be repeated to search for an SPS signal from the particular satellite of interest using the expanded code phase search window and the possibly expanded Doppler frequency shift search window. In one possible example among many, an initial search window for Doppler frequency shift may comprise a Doppler frequency shift of ±1.0 kHz and may be expanded, at block 320, for example, to ±1.1 kHz. An expanded search over a window of ±1.1 kHz may then be performed at block 325. In certain implementations, however, at block 325, previously searched portions of a search window may be skipped so as to not be performed a second time. For example, in the event that a Doppler frequency shift search within boundaries of ±1.0 kHz has been previously performed, and if an expanded search window of ±1.5 kHz is requested, an additional search may involve the region of −1.1 kHz to −1.0 kHz and +1.0 kHz to +1.1 kHz. In implementations, searches may continue until, for example, a maximum search space in both Doppler frequency shift (e.g., ±5.0 kHz) and pseudorandom code phase (e.g., 0.0 to 1.0 ms, 0 to 1023 chips, or other appropriate metric) has been conducted.

If, after performing a search at block 325, block 330 indicates that a signal from an SPS satellite of interest has been acquired, block 335 may be performed in which position measurements (e.g., pseudo-ranges, pseudo-Doppler) are reported to a location server. Otherwise, searching may continue by repeating blocks 345, 350, 355, 320, 325, and 330 as just described until the maximum counter value is exceeded in block 350 or until an SPS signal of interest has been acquired in block 330. The procedure in FIG. 4 may also be further repeated to acquire and measure SPS signals from other satellites for which acquisition assistance data was received by the mobile device from the location server at block 210 of FIG. 3. At block 340, the location server may compute a position of the mobile device. A location server may utilize a computed position estimate to refine future initial estimated locations of other mobile devices receiving signals from the same base station(s) and/or access point(s).

In implementations, an initial search window, for search counter equal to one (1) at block 310, for example, may correspond to a first confidence value that a mobile device may be able to acquire a signal from one or more satellites of an SPS. In one possible example, a first confidence value may correspond to approximately 1σ or approximately 68.2% confidence. In certain implementations, a subsequent search window, for example, search counter equal to two (2), may correspond to a second confidence value that a mobile device may be able to acquire a signal from an SPS. Accordingly, for example, a second confidence value may correspond to approximately 2σ, or 95.45% confidence. However, claimed subject matter is not limited in this respect as many search techniques may result in acquisition assistance parameters to mobile devices.

Figure 4:
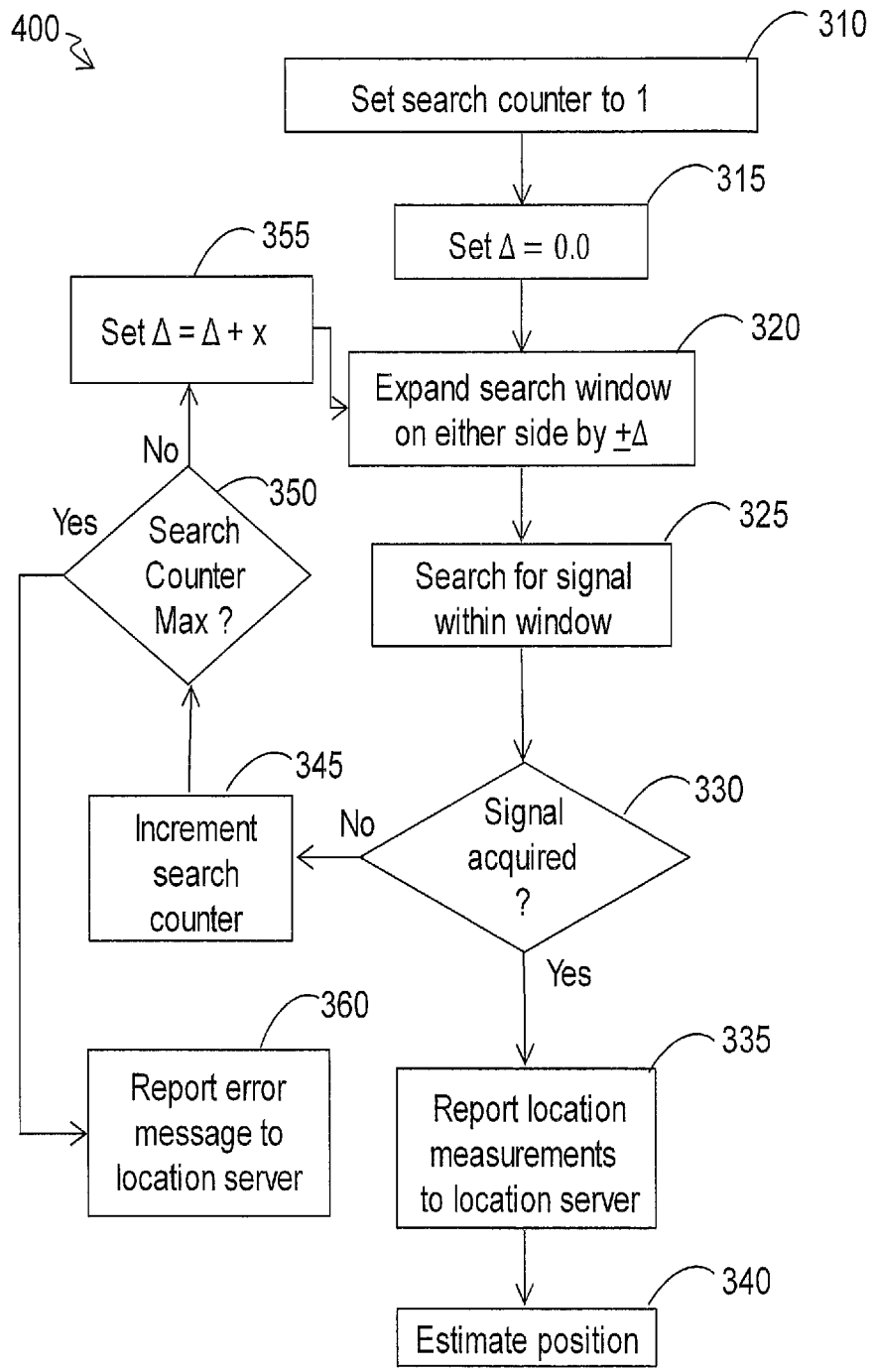
FIG. 4 is a flow diagram of a search method used in a mobile device for receiving acquisition assistance according to an example implementation.

The search strategy exemplified in FIG. 4 may be based on an indicated reliability and/or confidence for the search windows received by the mobile device in block 210 of FIG. 3. For example, if the server indicates that the search windows and any provided confidence are not reliable, the target may proceed to search the entire possible range of frequencies and code phases in block 325 of FIG. 4 (e.g. by setting "x" to a large value and the maximum search counter to two) if signals are not found using the provided search windows in the first execution of block 325. If the server indicates that the search windows and confidence are reliable but the confidence is not high (e.g. smaller than 95%), the target may employ a larger value for the maximum search counter and a smaller value for "x" on the assumption that actual signal frequency and code phase will be close to the provided search windows if not actually within the windows. If the server indicates that the search windows and confidence are reliable and the confidence is high (e.g. 98% or more), the target may only search within the provided search windows by setting the maximum search counter to one.

Figure 5:
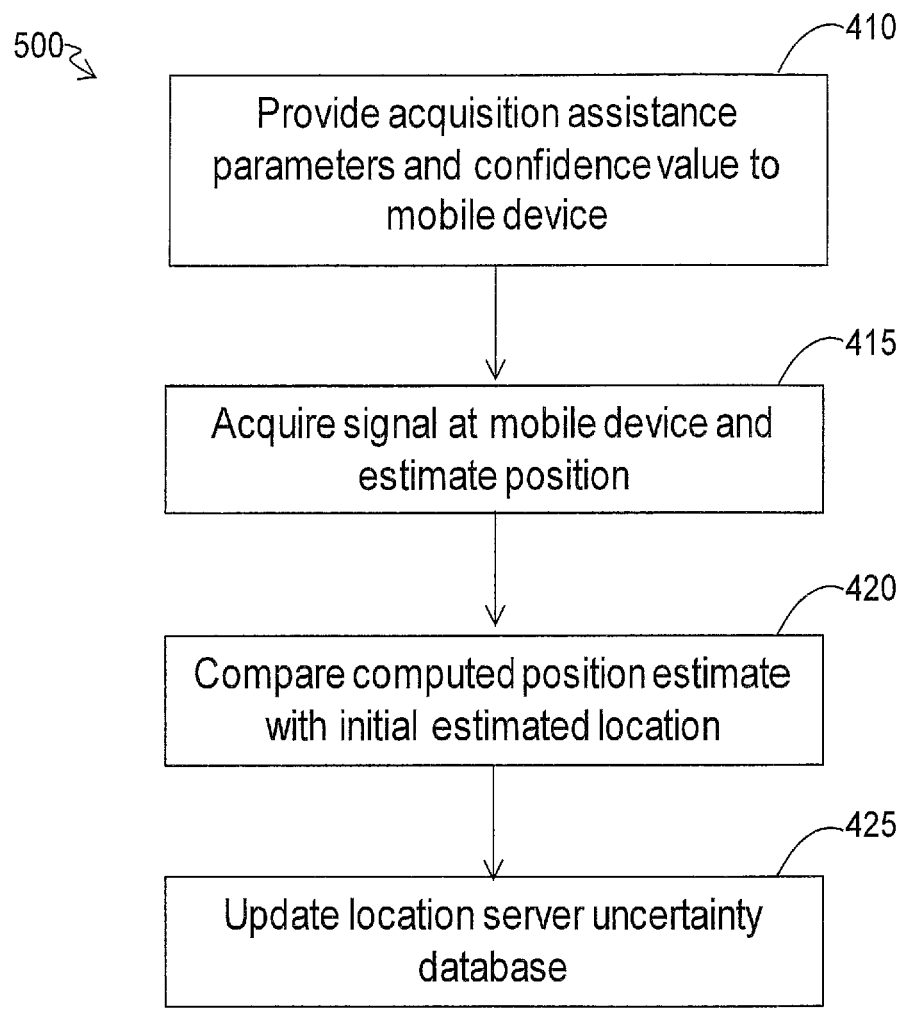
FIG. 5 is a flow diagram for updating a database used in a communication system for providing acquisition assistance according to an example implementation.

FIG. 5 is a flow diagram 500 for updating a database used in a communication system for providing acquisition assistance according to an example implementation. The method of FIG. 5 may begin at block 410, in which acquisition assistance parameters and confidence values may be conveyed to a mobile device. At block 415, a mobile device may utilize acquisition assistance parameters to acquire signals from an SPS and transmit location measurements to a location server for position calculation, or transmit a computed estimate of position to a location server. At 420, a location server may compare a computed position estimate with an initial approximate estimated location. At 425, a database may be updated with corrected initial estimate locations and corrected uncertainty areas based on computed position estimates by mobile devices. The updating may be associated with a stored location of a particular base station or access point (e.g., a serving base station or access point) used by the location server to compute the initial approximate estimated location. For example, if the computed position is close to the initial approximate estimated location (e.g. is within an uncertainty area for this location), an increased confidence or reliability may be assigned and stored in association with the stored location. Conversely, if the computed position is distant from the initial approximate estimated location, a reduced confidence or reliability may be assigned and stored in association with the stored location. In addition or alternatively in this case, the stored location may be changed (e.g. may be set to an average of the computed locations for a plurality of mobile devices whose locations are computed using initial approximate location estimates based on the stored location for the same base station or access point).

Figure 6:
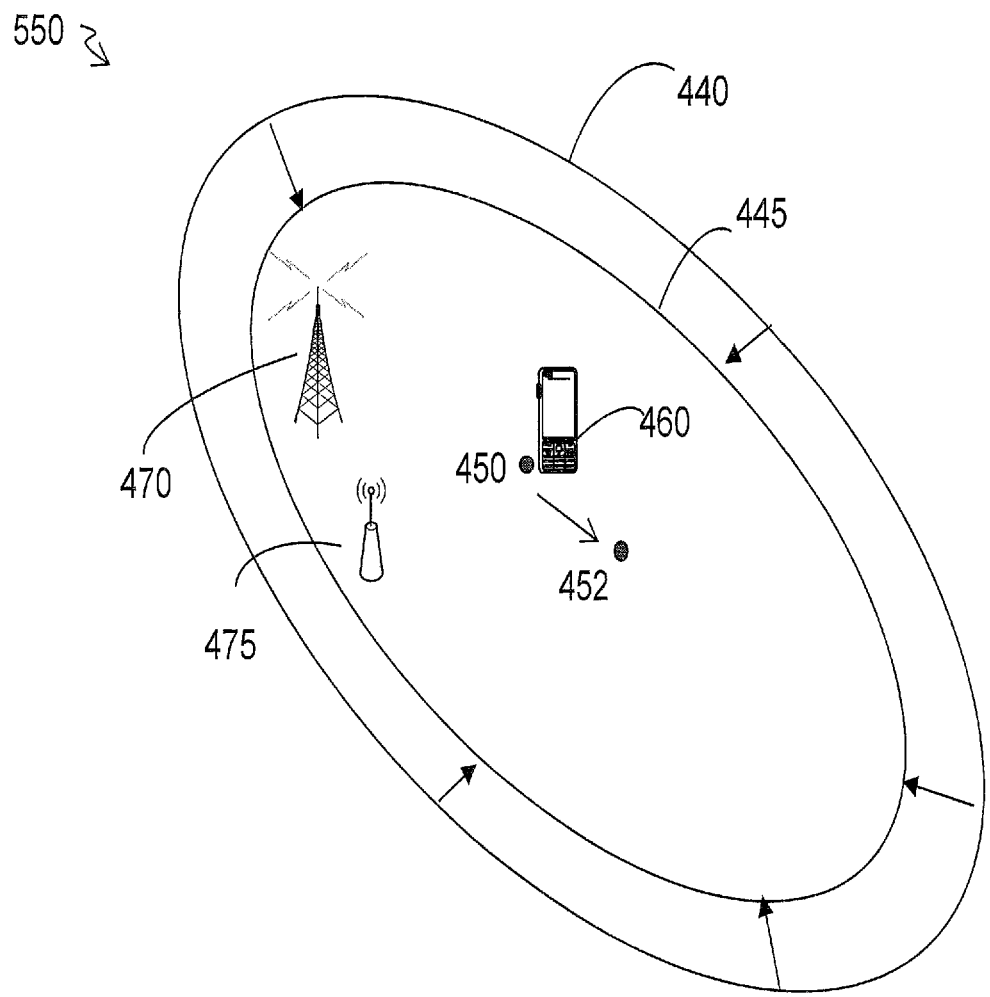
FIG. 6 is a schematic diagram showing a change to an initial estimated location and uncertainty area resulting from a mobile device computing a position estimate according to an example implementation.

FIG. 6 is a schematic diagram 550 showing a change to an initial estimated location and uncertainty area resulting from a mobile device computing a position estimate according to an example implementation. In an implementation, a location server coupled to terrestrial cellular base station 470 and/or local transmitter 475 (e.g., IEEE standard, Bluetooth, or 802.11 access point) by way of an intervening communications network may initially locate mobile device 460 at location 450. A location server may additionally compute an uncertainty area 440. In some implementations, location 450 and uncertainty area 440 may be computed utilizing the known location of a station 470 or 475 together with a coverage area for the station.

If acquisition assistance parameters are transmitted to mobile device 460, the mobile device may acquire one or more signals from an SPS. Acquired SPS signals may allow computing an estimated position of mobile device 460 corresponding to location 452. Similarly, if acquisition assistance parameters are conveyed to additional mobile devices in this initial uncertainty area (not shown), the additional mobile devices may also acquire signals from an SPS, which may allow a computing an estimated position of these additional mobile devices. Consequently, the determined mobile device locations may be used to update the initial uncertainty area 440. If the plurality of mobile locations are located within a smaller uncertainty area, a location server may reduce an uncertainty area within which mobile devices may likely be located, such as, for example, from an area 440 to a smaller area 445. The location server may instead, or in addition, update the confidence level associated with the initial location uncertainty area for this reference location.

Figure 7:
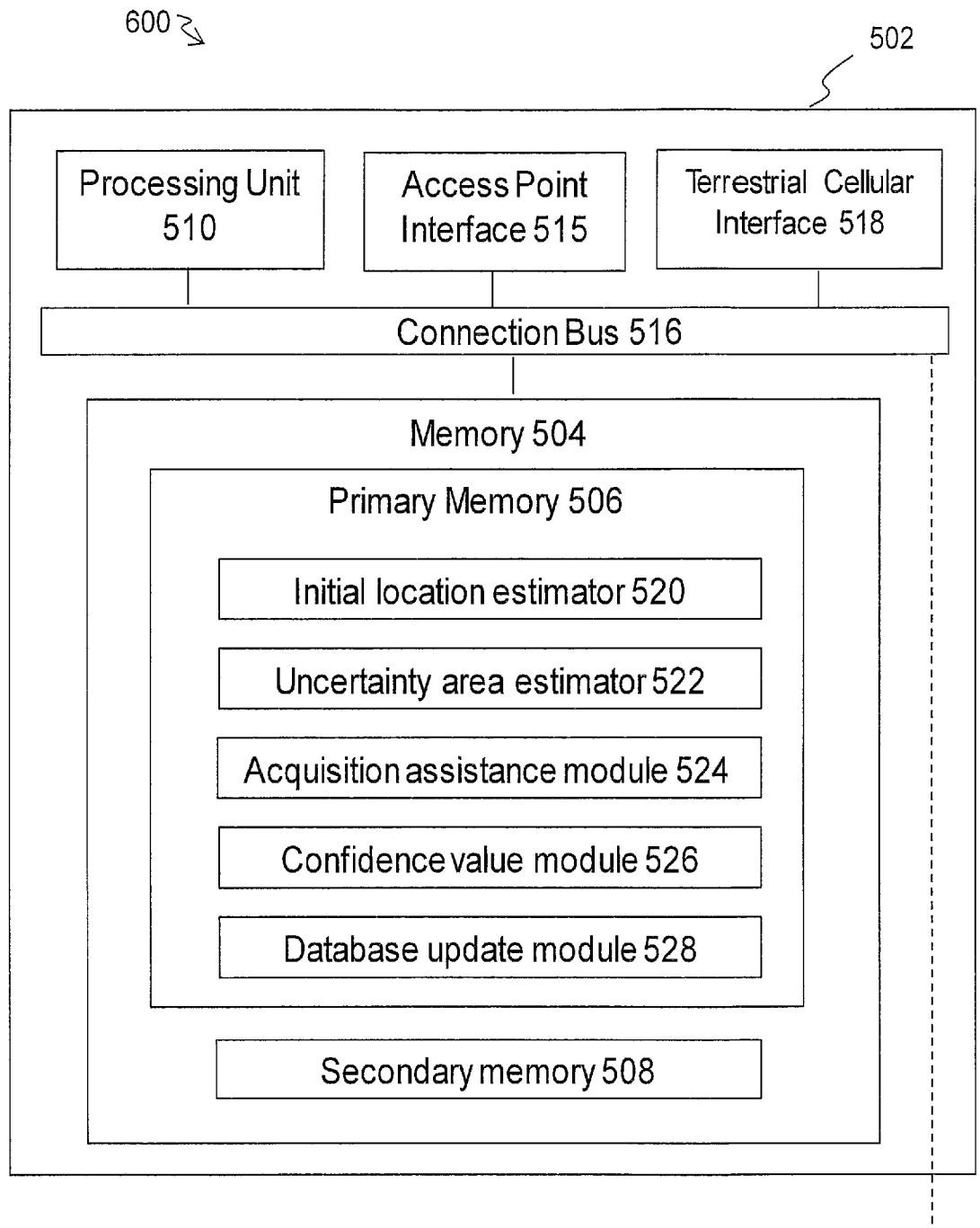
FIG. 7 is a schematic diagram illustrating certain features of an example computing platform which may perform functions of a location server for use in a method for mobile device acquisition assistance according to an example implementation.

FIG. 7 is a schematic block diagram 600 illustrating certain features of an example computing platform 502 which may perform functions of a location server for use in a method for mobile device acquisition assistance according to an example implementation. In the implementation of FIG. 7, one or more processing units 510 may perform data processing and functionality associated with location server 80 of FIG. 1. Processing unit 510 may, for example, be implemented in hardware or a combination of hardware and software. Processing unit(s) 510, which may operation in association with connection bus 516, may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 504 may be representative of any data storage mechanism. Memory 504 may include, for example, a primary memory 506 and/or a secondary memory 508. Primary memory 506 may comprise, for example, a random access memory, read only memory, etc. While illustrated in this example as being separate from the processing units, it should be understood that all or part of a primary memory may be provided within or otherwise co-located/coupled with processing unit 510, or other like circuitry within computing platform 502. Secondary memory 508 may comprise, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, a non-transitory computer-readable medium 512. Computer-readable memory 512 may include instructions 514, which, when executed by a processor result in the processor performing a method for mobile device acquisition assistance.

Computing platform 502 may, for example, further comprise access point interface 515 and terrestrial cellular interface 518. Access point interface 515 may provide communications with one or more access points, which may include Wi-Fi access points, piconet access points, or other components of a wireless digital communication system. Terrestrial cellular interface 518, for example, provide connectivity to terrestrial cellular base station 70 of FIG. 1 as well as providing connectivity with additional cellular base stations not shown in FIG. 1.

Processing unit 510 and/or instructions 514 may, for example, provide or otherwise be associated with one or more signals that may be stored in memory 504 from time to time, such as: initial location estimator 520, uncertainty area estimator 522, acquisition assistance module 524, confidence value module 526, and/or database update module 528.

In implementations, initial location estimator 520 may, for example, be used by processing unit 510 to locate a mobile device approximately at an initial estimated location, such as location 50 of FIG. 1. Accordingly, initial location estimator 520 may include logic modules for interpreting signal characteristics from mobile devices by, for example, applying AFLT, OTDOA, CID, ECID, or other technique for estimating an initial location of a mobile device.

Uncertainty area estimator 522 may, for example, comprise instructions used by processing unit 510 to compute an uncertainty area, which may correspond, for example, to an area having outer boundary 40 of FIG. 1. Acquisition assistance module 524 may, for example, comprise instructions used by processing unit 510 to compute acquisition assistance parameters, such as Doppler frequency shifts, satellite identifiers, and/or pseudorandom code phase timing parameters. Confidence value module 526 may, for example, compute confidence values which may be transmitted to a mobile device, resulting, at least in part, in a mobile device performing a search function to acquire signals from an SPS. Database update module 528 may, for example, accept estimated positions from mobile devices resulting, at least in part, in an update of initial estimated locations and uncertainty areas associated with signal characteristics from mobile devices, such as mobile device 60 of FIG. 1.

Figure 8:
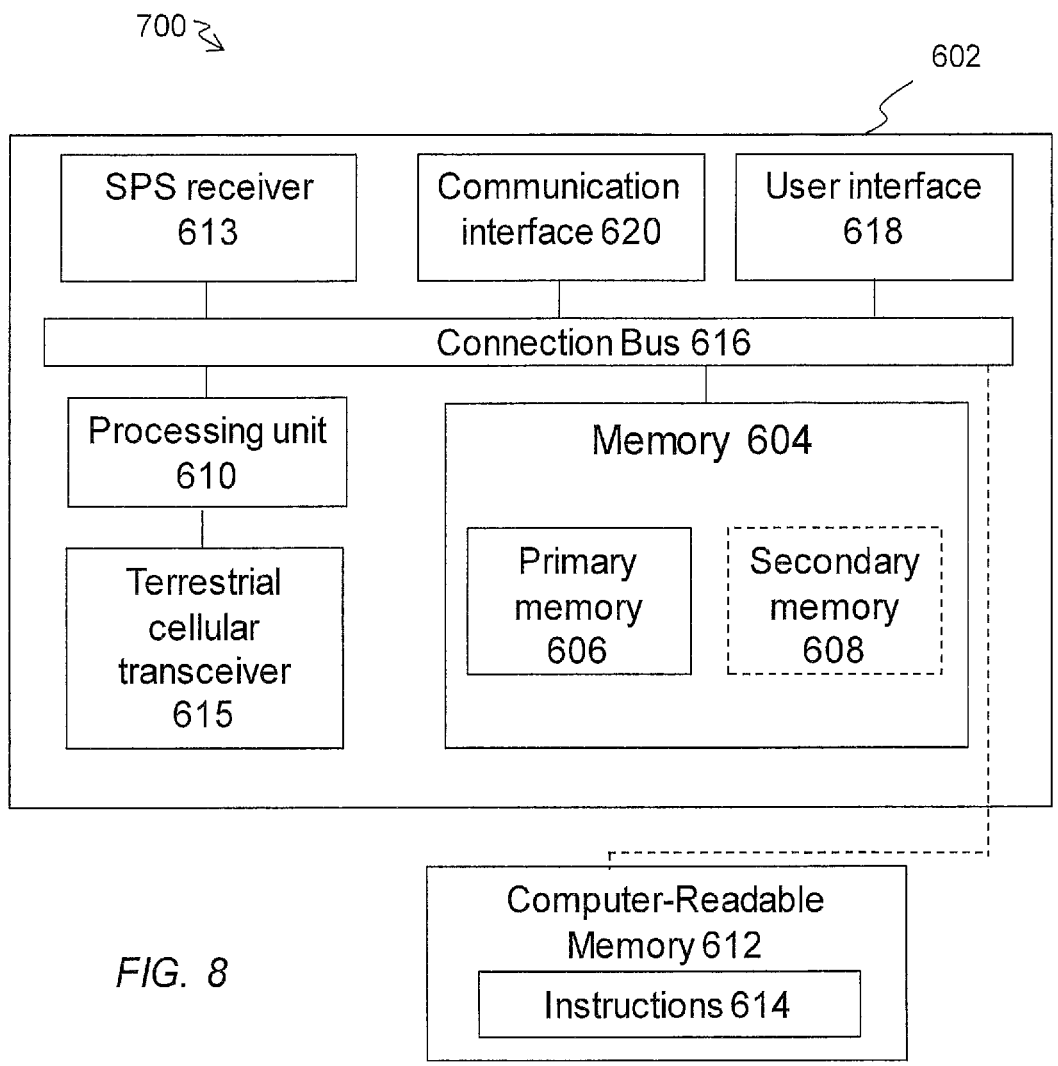
FIG. 8 is a schematic diagram illustrating certain features of a computing environment in a mobile device for use in a method for mobile device acquisition assistance according to an example implementation.

FIG. 8 is a schematic diagram 700 illustrating certain features of a computing environment in a mobile device for use in a method for mobile device acquisition assistance according to an example implementation. It should be appreciated that all or part of various devices or networks shown in computing environment 700, processes, or methods, as described herein, may be implemented using various hardware, firmware, or any combination thereof along with software.

Computing environment may include, for example, a mobile device 602, which may be communicatively coupled to any number of other devices, mobile or otherwise, via a suitable communications network, such as a terrestrial cellular telephone network, the Internet, mobile ad-hoc network, wireless sensor network, wireless access point, Piconet, femtocell, or the like. In an implementation, mobile device 602 may be representative of any electronic device, appliance, or machine that may be capable of exchanging information over any suitable communications network. For example, mobile device 602 may include one or more computing devices or platforms capable of benefiting from acquisition assistance to compute a position estimation associated with, for example, cellular telephones, satellite telephones, smart telephones, personal digital assistants (PDAs), laptop computers, personal navigation devices, or the like. In certain example implementations, mobile device 602 may take the form of one or more integrated circuits, circuit boards, or the like that may be operatively enabled for use in another device. Although not shown, optionally or alternatively, there may be additional devices, mobile or otherwise, communicatively coupled to mobile device 602 to facilitate or otherwise support one or more processes associated with computing environment 700. Thus, unless stated otherwise, to simplify discussion, various functionalities, elements, components, etc. are described below with reference to mobile device 602 may also be applicable to other devices not shown so as to support one or more processes associated with example computing environment 700.

Memory 604 may represent any suitable or desired information storage medium. For example, memory 604 may include a primary memory 606 and a secondary memory 608. Primary memory 606 may include, for example, a random access memory, read only memory, etc. While illustrated in this example as being separate from a processing unit, it should be appreciated that all or part of primary memory 606 may be provided within or otherwise co-located/coupled with processing unit 610. Secondary memory 608 may include, for example, the same or similar type of memory as primary memory or one or more information storage devices or systems, such as, for example, a disk drive, an optical disc drive, a tape drive, a solid state memory drive, etc. In certain implementations, secondary memory 608 may be operatively receptive of, or otherwise enabled to be coupled to, a non-transitory computer-readable medium 612.

Computer-readable medium 612 may include, for example, any medium that can store or provide access to information, code or instructions, such as instructions 614 printed thereon (e.g., an article of manufacture, etc.) for one or more devices associated with computing environment 700. For example, computer-readable medium 612 may be provided or accessed by processing unit 610. As such, in certain example implementations, the methods or apparatuses may take the form, in whole or part, of a computer-readable medium that may include computer-implementable instructions stored thereon, which, if executed by at least one processing unit or other like circuitry, may enable processing unit 610 or the other like circuitry to perform all or portions of a location determination processes, with or without receiving acquisition assistance, within mobile device 602. In certain example implementations, processing unit 510 may be capable of performing or supporting other functions, such as communications, gaming, or the like.

Processing unit 610 may be implemented in hardware or a combination of hardware and software. Processing unit 610 may be representative of one or more circuits capable of performing at least a portion of information computing technique or process. By way of example but not limitation, processing unit 610 may include one or more processors, controllers, microprocessors, microcontrollers, application specific integrated circuits, digital signal processors, programmable logic devices, field programmable gate arrays, or the like, or any combination thereof.

Mobile device 602 may include various components or circuitry, such as, for example, SPS receiver 613, terrestrial cellular transceiver 615, and/or various other sensor(s), such as a magnetic compass, a gyroscope, etc. to facilitate or otherwise support one or more processes associated with computing environment 700. For example, such sensors may provide analog or digital signals to processing unit 610. Although not shown, it should be noted that mobile device 602 may include an analog-to-digital converter (ADC) for digitizing analog signals from one or more sensors. Optionally or alternatively, such sensors may include a designated (e.g., an internal, etc.) ADC(s) to digitize respective output signals, although claimed subject matter is not so limited.

Although not shown, mobile device 602 may also include a memory or information buffer to collect suitable or desired information, such as, for example, accelerometer measurement information (e.g., accelerometer traces), as previously mentioned. Mobile device may also include a power source, for example, to provide power to some or all of the components or circuitry of mobile device 602. A power source may be a portable power source, such as a battery, for example, or may comprise a fixed power source, such as an outlet (e.g. in a house, electric charging station, etc.). It should be appreciated that a power source may be integrated into (e.g., built-in, etc.) or otherwise supported by (e.g., stand-alone, etc.) mobile device 602.

Mobile device 602 may include one or more connection bus 616 (e.g., buses, lines, conductors, optic fibers, etc.) to operatively couple various circuits together, and a user interface 618 (e.g., display, touch screen, keypad, buttons, knobs, microphone, speaker, trackball, data port, etc.) to receive user input, facilitate or support sensor-related signal measurements, or provide information to a user. Mobile device 602 may further include a communication interface 620 (e.g., wireless transmitter or receiver, modem, antenna, etc.) to allow for communication with SPS receiver 613 and terrestrial cellular transceiver 615 over one or more suitable communications networks.

Figure 9:
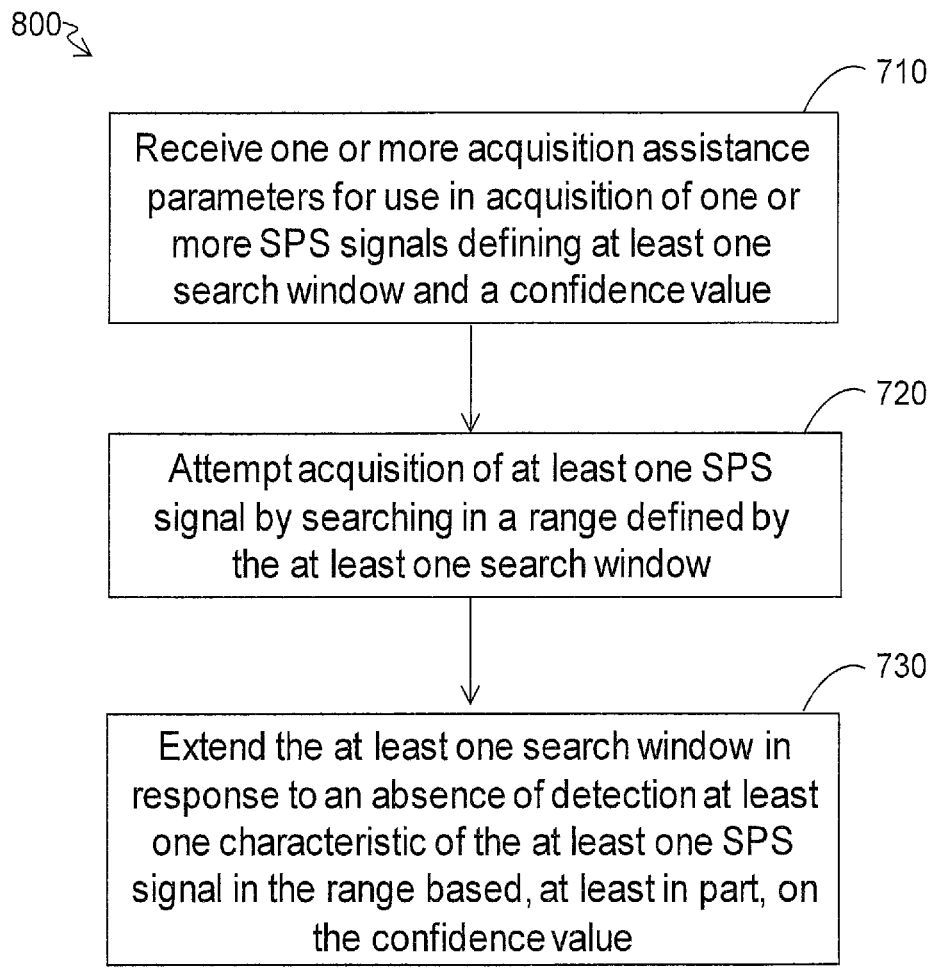
FIG. 9 is a flowchart for a method performed at a mobile device for using acquisition assistance parameters in acquiring one or more SPS signals according to an example implementation.

FIG. 9 is a flowchart for a method performed at a mobile device for using acquisition assistance parameters in acquiring one or more SPS signals according to an example implementation. The method may begin at block 710, which comprises receiving one or more acquisition assistance parameters for use in acquisition of one or more SPS signals defining at least one search window and a confidence value. The method may continue at block 720, which comprises attempting acquisition of at least one SPS signal by searching in a range defined by the at least one search window. The method may continue at block 730, which comprises extending the at least one search window in response to an absence of detection of at least one characteristic of the at least one SPS signal in the range based, at least in part, on the confidence value.

In accordance with certain example implementations, communication interface 620 of FIG. 8, access point interface 515 (FIG. 7), and/or terrestrial cellular interface 518 (FIG. 7) may be enabled for operability with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, HRPD, Ultra Mobile Broadband (UMB), and/or the like. Additionally, communication interface 620 may further provide for infrared-based communications with one or more other devices.

The exemplary implementations so far described herein have shown how acquisition assistance parameters, which may contain a confidence and/or reliability indication, may be used to improved positioning using methods such as GNSS, OTDOA and AFLT. In such cases, a location server may determine an initial approximate expected location estimate for a mobile device and an uncertainty area (e.g. using the serving cell, base station or access point and its known or predicted coverage area) and use these to determine (i) expected code phase values and Doppler frequency shift in the case of GNSS or (ii) expected pilot phase values in the case of AFLT or (iii) expected time difference of arrival values in the case of OTDOA. The server may further determine a confidence or reliability for these expected values and may send the resulting acquisition assistance parameters to the mobile device to assist position determination. The location server may then use the resulting location estimate (computed either by the mobile device or by the location server) to determine a more accurate set of acquisition assistance parameters for a further positioning attempt using the same or a different positioning method. For example, the location server may initially obtain a location estimate by sending the mobile device acquisition assistance parameters for OTDOA or AFLT. OTDOA and AFLT may enable location determination with medium, accuracy (e.g. to within a few hundred meters of the actual location) but not high accuracy (e.g. to within 50 meters or less). The location server may then use the location estimate produced by AFLT or OTDOA to determine acquisition assistance parameters including a confidence value and/or reliability indication for GNSS positioning and may send the parameters to the mobile device to invoke a second positioning attempt using GNSS. GNSS may enable location determination with high accuracy (e.g. 50 meters error or less) and the acquisition assistance parameters determined from the initial AFLT or OTDOA positioning may contain smaller search windows than if the location server had not invoked OTDOA or AFLT but had only used the serving cell, base station or access point to determine GNSS acquisition assistance parameters. The smaller search windows may allow GNSS measurements in difficult environments (e.g. indoors) where GNSS signals may be weak and may enable GNSS location to succeed and/or provide a more accurate location estimate than if AFLT or OTDOA had not been first used.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "applying," "generating," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method, at a location server, for providing acquisition assistance parameters for use in acquisition of one or more positioning system signals, comprising:
   determining, at said location server, via one or more processing units coupled to a memory, a first initial estimated location of a first mobile device based, at least in part, on service of said first mobile device from a serving cell, a serving base station or a serving access point, and determining a first uncertainty area of said first initial estimated location, said first uncertainty area being based, at least in part, on signals received by said first mobile device from said serving cell, said serving base station or said serving access point;

determining a confidence value for said first uncertainty area of said first initial estimated location, said confidence value being based, at least in part, on whether a previous initial estimated location of a second mobile device, served by said serving cell, by said serving base station or by said serving access point, was within a second uncertainty area determined for said previous initial estimated location;

obtaining, from a memory, said acquisition assistance parameters including one or more search windows based, at least in part, on said first initial estimated location; and transmitting, over a communications network, one or more messages comprising said acquisition assistance parameters and said confidence value for use by first mobile device.

2. The method of claim 1, further comprising said first mobile device scheduling processing resources to search within a search window for satellite positioning system (SPS) signals responsive to said first mobile device receiving said confidence value.

3. The method of claim 1, further comprising said first mobile device scheduling processing resources to search within a search window for positioning signals from one or more terrestrial base stations responsive to said first mobile device receiving said confidence value from at least one terrestrial base station.

4. The method of claim 1, and further comprising transmitting a measure of reliability based, at least in part, on a location of said serving base station or said access point being known to be correct or being known to have changed one or more times in the past.

5. The method of claim 1, wherein at least one of said one or more search windows comprises a search window of CDMA pilot phases.

6. The method of claim 1, wherein at least one of said one or more search windows comprises a time-of-arrival difference window for signals transmitted to said first mobile device from two or more terrestrial base stations.

7. The method of claim 1, wherein at least one of said one or more search windows comprises a GNSS Doppler frequency search window.

8. The method of claim 1, wherein at least one of said one or more search windows comprises a GNSS code phase search window.

9. The method of claim 8, wherein a first boundary of said code phase search window is computed to correspond to a location within an uncertainty area at an approximate furthest distance from a satellite of one or more satellite positioning system (SPS), and wherein a second boundary of said code phase search window is computed to correspond to a location within said uncertainty area at an approximate closest distance from said satellite.

10. The method of claim 1, wherein determining said first initial estimated location comprises associating a location of a currently serving base station with a location of said first mobile device.

11. An apparatus comprising:
a communications interface configured to transmit messages to and receive messages from a communications network; and
one or more processors configured to:
determine a first initial estimated location of a first mobile device, based, at least in part, on service of said first mobile device from a serving cell, a serving base station or a serving access point and determining a first uncertainty area of said first initial estimated location, said first uncertainty area to be based, at least in part, on signal parameters in messages received from said communications network at said communications interface, said signal parameters being related to signals received by said first mobile device from said serving cell, signals received by said serving base station or signals received by said serving access point, said signal parameters comprising serving cell signal parameters, serving base station signal parameters or serving access point signal parameters, or a combination thereof;
determine a confidence value for said first uncertainty area of said initial estimated location, said confidence value to be based, at least in part, on whether a previous initial estimated location of a second mobile device, served by said serving cell, by said serving base station or by said serving access point, was within a second uncertainty area determined for said previous initial estimated location; and
obtain, from a memory, acquisition assistance parameters to include one or more search windows based, at least in part, on said first initial estimated location;
initiate transmission, over said communications network through said communications interface, one or more messages comprising said acquisition assistance parameters and said confidence value for use by said first mobile device.

12. The apparatus of claim 11, wherein said one or more processors additionally are configured to compare said first initial estimated location with a position estimation transmitted by said first mobile device.

13. The apparatus of claim 11, wherein said one or more processors additionally are configured to accept an estimated position transmitted from said first mobile device resulting, at least in part, in an update of said first initial estimated location.

14. The apparatus of claim 13, wherein said one or more processors additionally are configured to update said first uncertainty area based, at least in part, on signals received by said first mobile device from said serving cell, said serving base station or said serving access point.

15. The apparatus of claim 11, wherein said acquisition assistance parameters comprise GNSS Doppler frequency shift and GNSS pseudorandom code phase.

16. The apparatus of claim 11, wherein said acquisition assistance parameters comprise a window of a CDMA pilot phase or a time-difference-of-arrival that permits said first mobile device to estimate position.

17. The apparatus of claim 16, wherein said acquisition assistance parameters permit said first mobile device to determine location using transmitted signals compatible with at least one of LTE, WCDMA, GSM, CDMA2000 1x, and HRPD.

18. The apparatus of claim 11, wherein said communications interface comprises a terrestrial cellular base station or a femtocell base station.

19. The apparatus of claim 11, wherein said communications interface comprises a small cell access node.

20. An article comprising:
a storage medium comprising non-transitory machine-readable instructions stored thereon which are executed by a special-purpose computing apparatus to:
determine a first initial estimated location of a first mobile device, based, at least in part, on service of said first mobile device from a serving cell, a serving base station or a serving access point, and a first uncertainty area of said first initial estimated location, said first uncertainty area being based, at least in part, on signals received by said first mobile device from said serving cell, said serving base station or said serving access point;
determine at least one confidence value for said first uncertainty area of said first initial estimated location for use in computing acquisition assistance parameters for use in acquisition of one or more positioning system signals, said at least one confidence value being based, at least in part, on whether a previous initial estimated location of a second mobile device, served by said serving cell, by said serving base station or by said serving access point, was within a second uncertainty area determined for said previous initial estimated location;
obtain, from a memory, said acquisition assistance parameters including one more search windows based, at least in part, on said first initial estimated location; and
initiate transmission of one or more messages over a communications network for use by said first mobile device, said acquisition assistance parameters and said at least one confidence value.

21. The article of claim 20, wherein said storage medium additionally comprises machine-readable instructions stored thereon which are executable by a special-purpose computing apparatus to:
initiate transmission of a reliability indicator, said reliability indicator to be based, at least in part, on a location of said serving base station or said serving access point being known to be correct or being known to have changed one or more times in the past.

22. The article of claim 20, wherein said non-transitory machine-readable instructions executed by said special-purpose computing apparatus are additionally to acquire positioning signals transmitted from one or more space vehicles of a satellite positioning system (SPS).

23. The article of claim 22, wherein said acquisition assistance parameters comprise a search window of a GNSS Doppler frequency shift and a GNSS pseudorandom code phase.

24. The article of claim 23, wherein said at least one confidence value comprises a first confidence value associated with said GNSS Doppler frequency shift and a second confidence value associated with said GNSS pseudorandom code phase.

25. The article of claim 20, wherein said acquisition assistance parameters are transmitted by a terrestrial cellular base station to permit said mobile device to estimate position using either pilot phase or time-difference-of-arrival.

26. An apparatus comprising:
means configured for determining a first initial estimated location of a first mobile device based, at least in part, on service of said first mobile device from a serving cell, a serving base station or a serving access point, and an uncertainty area of said first initial estimated location;
means configured for determining a first uncertainty area of said first initial estimated location based, at least in part, on signals received by said first mobile device from a said serving cell, said serving base station or said serving access point, said first uncertainty area to be based, at least in part, on signal parameters, said signal parameters to be related to signals received by said first mobile device from said serving cell, signals received by said serving base station or signals received by said serving access point, said signal parameters comprising serving cell signal parameters, serving base station signal parameters or serving access point signal parameters, or a combination thereof;
means configured for determining at least one confidence value for said first uncertainty area of said first initial estimated location, for use in computing acquisition assistance parameters for use in acquisition of one or more positioning system signals, said confidence value being based, at least in part, on whether a previous initial estimated location of a second mobile device, served by said serving cell, by said serving base station or by said serving access point, was within a second uncertainty area determined for said previous initial estimated location;
means configured for obtaining said acquisition assistance parameters including one or more search windows based, at least in part, on said first initial estimated location; and
means configured for transmitting, over a communications network, one or more messages comprising said acquisition assistance parameters and said at least one confidence value for use by said first mobile device.

27. The apparatus of claim 26, wherein said means configured for determining said first initial estimated location of said first mobile device comprises a processor for performing a method selected from the group consisting of advanced forward-link trilateration (AFLT), observed time difference of arrival (OTDOA) or enhanced cellular identification ECID, or any combination thereof.

28. The apparatus of claim 26, wherein said means configured for obtaining said acquisition assistance parameters includes means configured for providing a two-dimensional search window comprising a GNSS Doppler frequency shift and a GNSS pseudorandom code phase to permit said first mobile device to acquire said positioning signals from a satellite positioning system.

29. The apparatus of claim 26, wherein said means configured for obtaining said acquisition assistance parameters includes means configured for providing a search window comprising a range of pilot phase values or a range of time difference of arrival values.

* * * * *